US 6,728,854 B2

(12) United States Patent
Frank (10) Patent No.: US 6,728,854 B2
(45) Date of Patent: Apr. 27, 2004

(54) SYSTEM AND METHOD FOR PROVIDING TRANSACTION MANAGEMENT FOR A DATA STORAGE SPACE

(75) Inventor: Alexander Frank, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/855,856

(22) Filed: May 15, 2001

(65) Prior Publication Data

US 2002/0174314 A1 Nov. 21, 2002

(51) Int. Cl.[7] .............................................. G06F 12/00
(52) U.S. Cl. ...................................... 711/170; 711/154
(58) Field of Search ................................ 711/170, 118, 711/129, 154, 173

(56) References Cited

U.S. PATENT DOCUMENTS 6,353,874 B1 * 3/2002 Morein ....................... 711/118

2001/0037475 A1 * 11/2001 Bradshaw et al. ............ 714/15

* cited by examiner

Primary Examiner—Kimberly McLean-Mayo
(74) Attorney, Agent, or Firm—Leydig, Voit & Mayer, Ltd.

(57) ABSTRACT

A system and method for providing transaction management for writing operations on a data storage space, such as a cache, persistently tracks a "transient zone" that covers an active area in which write operations are being performed. The data storage space may be a linear space in which the operations of reclaiming space for writing new objects proceed as a wave. The "head" of the transient zone is set to stay ahead of the front of the wave, while the "tail" of the transient zone is set to stay behind or up to the active block at the rear edge of the active area. As the wave of space reclaiming travels along the data storage space, the head of the transient zone is moved from time to time to maintain a lead. The tail of the transient zone is also moved from time to time as writing operations are completed. When there is a non-graceful shutdown, the data blocks within the transient zone are viewed as corrupted and are discarded, but the data outside the transient zone are stable (not corrupted) and thus still usable for recovery.

20 Claims, 4 Drawing Sheets

SYSTEM AND METHOD FOR PROVIDING TRANSACTION MANAGEMENT FOR A DATA STORAGE SPACE

TECHNICAL FIELD OF THE INVENTION

This invention relates generally to computer data storage and retrieval, and more particularly to a way to provide transaction management in connection with write operations on a data storage space, such as a cache, to enable data recovery in the case of a non-graceful shutdown.

BACKGROUND OF THE INVENTION

A cache is an amount of data storage space that is used to hold recently accessed data for future access. The retrieval of data from the cache is typically significantly faster than accessing a data source from which the data in the cache are originally obtained. By storing recently accessed data in the cache, the data can be retrieved and made available quickly the next time they are requested. Data caching is one of the most fundamental concepts in computer science and has been widely applied in various applications where it is desirable to minimize the data access time.

For instance, in the context of accessing information available from the World Wide Web ("WWW") on the Internet, it is common for a proxy server of a private network to use a cache unit to store data objects downloaded from various Websites in response to requests by computers on the private network. When the proxy server receives a request from a computer on the private network for a particular data object, it first checks the cache unit to see whether the requested object is already in the cache unit. If there is a cache hit (i.e., the requested data object is found in the cache unit), the requested object is retrieved from the cache and sent to the requesting computer. On the other hand, if the requested object is not in the cache, the proxy server forwards the request on to the Internet so the requested data object can be downloaded from a Website. Since the speed of downloading data objects from Websites can be very slow, a properly implemented cache unit can significantly reduce the average amount of time for a user to receive a requested data object, thereby providing a significantly improved user experience.

The performance requirements on the cache unit can be very high. For instance, a typical implementation of a cache unit may be expected to hold 50 million data objects. With such a large number of data objects, it can become very difficult to effectively manage the usage of the cache space to provide an adequate performance of the caching operation.

One of the different aspects of cache management that can become more complicated as the number of objects increases is transaction management. In the parlance of computer science, a database management system should pass the "ACID test." The acronym "ACID" stands for atomicity, consistency, isolation, and durability, which form a set of requirements that should be satisfied by a well-designed database management. Transaction management for a data storage space, such as the cache unit for caching downloaded objects, facilitates the atomicity aspect by monitoring operations that write data objects into the storage space to keep track of whether the operations have been completed successfully. This information is necessary to ensure that the stored data can be reliably recovered in the case of a non-graceful shutdown during which the regular measures for ensuring the integrity of data and operational states cannot be taken. A non-graceful shutdown may be caused by a variety of reasons such as power failure, hardware break down, software problems such as operating system crashes, administration fault (which leads to the termination of the process that executes the cache unit), etc. Without transaction management, it is difficult to tell after the non-graceful shutdown which objects in the database had been written successfully before the shutdown and which objects may have undefined contents because their write operations were interrupted by the shutdown.

Traditional transaction management schemes often employ complex data structures for keeping track of the transactional status of write operations and require high overhead to maintain the data structures. In the case of managing a cache, when the number of objects to be cached becomes very large, transaction management based on conventional schemes can become highly complex and require unacceptably high overhead, causing the caching operation to slow down significantly.

SUMMARY OF THE INVENTION

In view of the foregoing, the present invention provides a system and method for providing transaction management for write operations performed on a data storage space, such as a cache. The invention is based on the recognition that in the context of object caching and some other applications it is acceptable to lose some data (e.g., 5–10%). In accordance with this recognition, the invention provides a very simple transaction management model that is inherently "lossy" but is very easy to implement and has extremely low operational overhead. In this transaction management model, the data storage space is viewed as having one (or more) generally localized active area that contains active data objects, i.e., objects on which the write operations are ongoing. A transient zone is set to cover the active area, and the boundary of the transient zone is adjusted from time to time to maintain a comfortable margin from the active area. The boundary of the transient zone is persistently tracked so that the boundary information will not be lost in the case of a non-graceful shutdown. When there is a non-graceful shutdown, the data within the transient zone are deemed corrupted and may be discarded, while the data outside the transient zone should still be stable (i.e., not corrupted) and may be used for data recovery.

The transaction management of the invention is drastically simpler and faster than traditional transaction management schemes. The computation time complexity of the transaction management scheme of the invention is of the order of O(1) per write operation of a data object. The sizes of memory and persistent storage spaces that are required to support the transaction management are also O(1). Moreover, the number of I/O write operations required by the transaction management scheme is O(1) for supporting reliable persistence of data as large the whole cache. That is, this system needs a small constant number of I/O write operations to manage and support reliable caching of fresh data as large as the whole cache space. These outstanding complexity estimations are affected by neither the number of ongoing write operations nor the size of the dataset or cache storage space.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
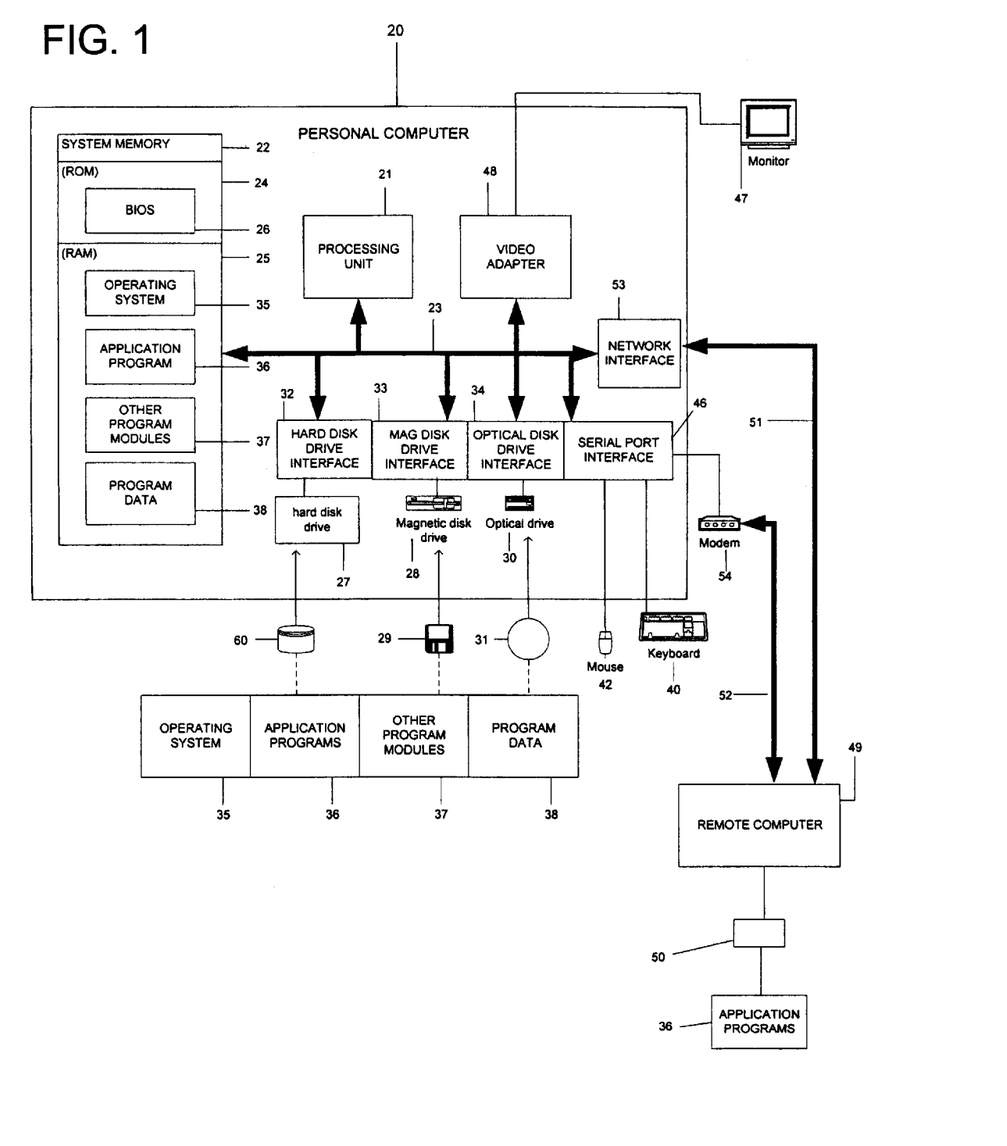
FIG. 1 is a block diagram generally illustrating an exemplary computer system on which the present invention may be implemented.

The following description begins with a description of a general-purpose computing device that may be used in an exemplary system for implementing the invention, and the invention will be described in greater detail with reference to FIGS. 2–4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
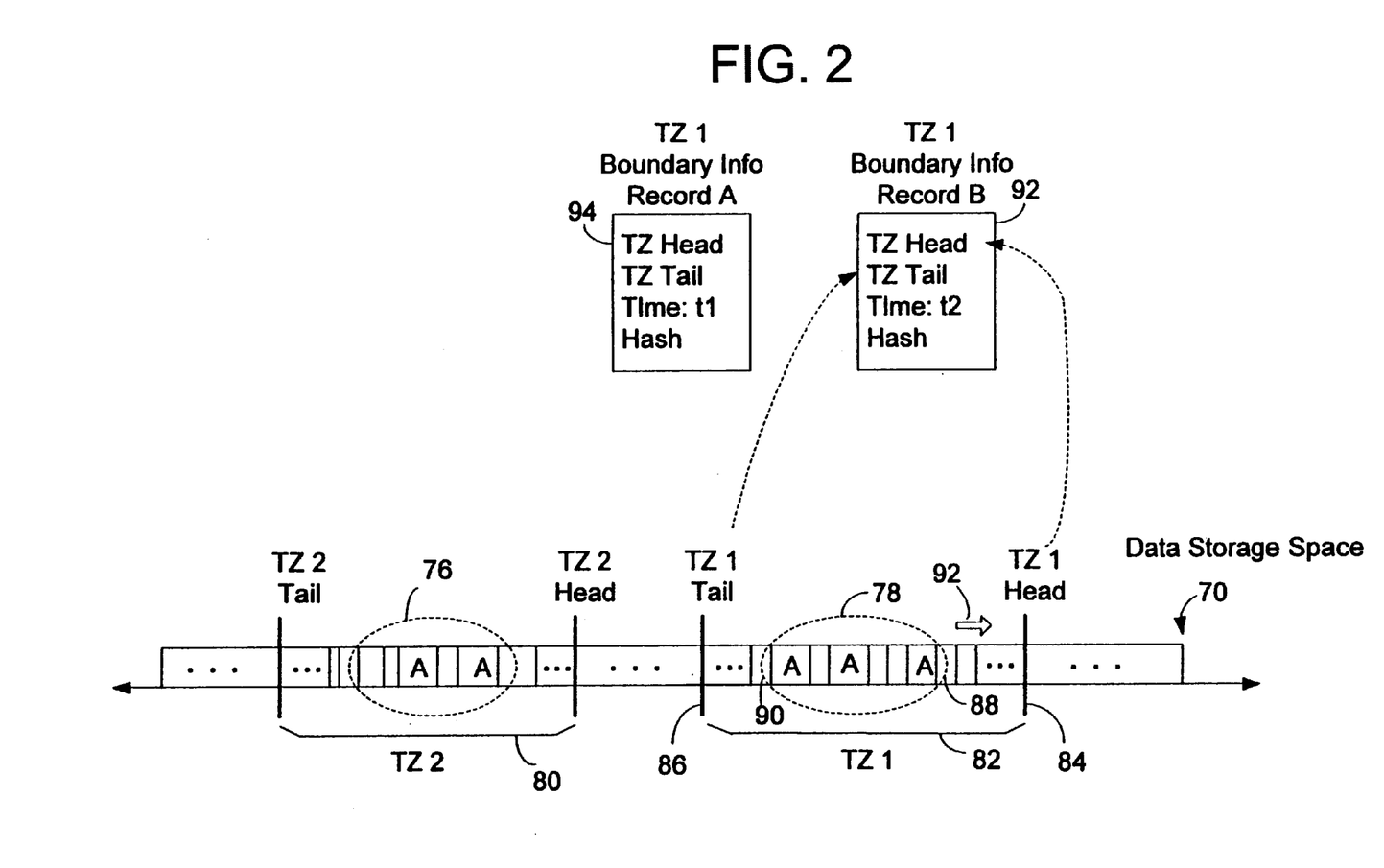
FIG. 2 is a schematic diagram illustrating an embodiment of the invention in which transaction management is provided by persistently tracking a transient zone, the boundary of which is set to cover an active area of a data storage space.

Referring now to FIG. 2, the present invention is directed to a unique approach to providing transaction management for write operations performed on a data storage space, such as a cache. The data storage space may reside on various types of storage media that satisfy the requirements of persistence and generally sequential addressing and access to stored data. For instance, the data storage space may be on a mass storage device such as a hard disk, magnetic tape, or flash memory. The exact type of the storage media is not critical, and transaction management according to the invention can be advantageously applied as long as the space for data storage is managed in such a way that active objects involved in ongoing write operations fall within one (or more) generally localized active area.

The transaction management of the invention is based on the recognition that in certain applications the complete recoverability of data stored in a data storage space is not a requirement, and it is acceptable to lose some data during a non-graceful shutdown. Based on that recognition, the present invention provides a transaction management model that allows some degree of data loss in exchange for an extremely simple mechanism for keeping track of whether write operations on data objects in the storage space have been successfully completed. The transaction management of the invention is especially suitable for managing a data cache, because it is acceptable for a cache to lose a small amount of data (e.g., 5–10%) in a non-graceful shutdown without causing significant degradation of the cache performance after the computer comes back from a recovery. This is in contrast to most database applications, where there is no or minimal tolerance for data loss or corruption.

The broad concept of the transaction management according to the invention is now described with the aid of FIG. 2. FIG. 2 shows a data storage space 70 that has a plurality of objects schematically illustrated as small individual boxes. Some of the objects are "active," meaning that they are involved in ongoing write operations. In accordance with the invention, if the data storage space 70 is managed such that those active data objects (e.g., the objects denotes in FIG. 2 with the letter "A") can be viewed as falling within one or more generally localized active areas, then a transient zone can be defined for each active area to cover that active area. For instance, for illustration purposes, the data storage space is shown to have two active areas 76 and 78 with their respective transient zones 80, 82. The number of active areas in the data storage space would depend on how the data storage space is managed.

As an active area 78 expands or moves, the boundary of the corresponding transient zone 82 is adjusted so that the transient zone always covers the active area. The boundary of the transient zone 82 is persistently tracked so that the boundary data will not be lost during a non-graceful shutdown. When a non-graceful shutdown occurs, the data objects within the transient zone 82 are deemed to be corrupted and may be discarded, while the data outside the transient zone 82 (and other transient zones if they exist) should still be good and can be used for data recovery. In this way, transaction management is provided in the sense that the extent of data corruption caused by a non-graceful shutdown can be clearly defined so that a good portion of the data in the data storage space can be recovered.

For illustration purposes, the data storage space 70 in FIG. 2 is shown as a linear space (in the addressing sense). As explained in greater detail below, however, the concept of using a transient zone to contain a generally localized active area to provide transaction management is equally applicable in cases where the storage space has a two or higher dimensional address space.

In a preferred embodiment where the data storage space is a linear space as illustrated in FIG. 2, the active areas move generally in a pre-selected direction illustrated by the arrow 96. With reference to that direction, each transaction zone has a "head" and a "tail," which define the boundary of the transient zone. For example, in the linear storage space 70 shown in FIG. 2, the transient zone 82 has a head 84 and a tail 86. The transient head 84 is adjusted to stay ahead of the front 88 of the active area 78, while the tail 86 of the transient zone is set to stay behind or up to the rear edge 90 of the active area. As the active area 78 moves along the linear data storage space, the head 84 of the transient zone is moved from time to time to maintain a lead. The tail 86 of the transient zone is also moved from time to time as writing operations are completed so that it does not fall too far behind the active area.

Since the size of the transient zone determines the amount of data that will be lost when there is a non-graceful shutdown, it is preferable to maintain the transient zone boundary so that the size of the transient zone stays within a reasonable range. That reasonable range can be flexibly set based on various performance requirements and considerations. For instance, the transient zone may be set to cover no more than 10% of the overall data storage space, or no more than a certain amount of space, such as 10 Mbytes. Alternatively or additionally, the transient zone may be dynamically set to limit the gap between the active area front edge and the transient zone head as well as the gap between the active area rear edge and the transient zone tail.

For this transaction management model to work, it is necessary to ensure the reliability of the information representing the boundary of the transient zone. In other words, the transient zone boundary information, which is to be used for data recovery after a non-graceful shutdown, should be persistently stored so that they will not be corrupted by the non-graceful shutdown.

In one embodiment, due to hardware constraints, the process of updating and persisting a record takes some time and is not atomic. These phenomena challenge the reliability of the boundary information in case of a non-graceful shutdown). In order to ensure the reliability of the boundary information, the persistent tracking of the boundary information is achieved by using two records, instead of one, to persistently store the boundary information. As illustrated in FIG. 2, each of the records 92 and 94 includes fields representing the transient zone ("TZ") head, the transient zone tail, a time stamp of when the transient zone boundary information is updated, and a hash value of those fields. The two records are used alternatingly to record changes in the transient zone boundary. For instance, if the first record is used to record the transient boundary when the transient head or tail is moved at time t1, then the second record is used to record the new transient boundary the next time the transient zone head or tail is moved at time t2. Thus, at most one of the records is active, i.e. undergoing update and write operation. This scheme ensures that at any given time at least one record is guaranteed to be stable and valid.

Even though the transient zone boundaries in the two records do not overlap exactly, each of them is sufficiently large to cover the active area 78 so that it will cover all the data objects that are actually corrupted by a non-graceful shutdown. After the non-graceful shutdown, the integrity of each transient zone boundary record is verified by checking the boundary information and time stamp against the hash value. Even if it is possible for one record to be corrupted by being updated at the time the shutdown occurred, the other record is still good for defining the transient zone. When both records are valid, the more recent one is used.

With the general concept of the invention described above, the following description is directed to an embodiment in which the data storage space is a cache unit used by a proxy server for caching objects downloaded from the World Wide Web ("WWW") on the Internet. It will be appreciated, however, that the transaction management according to the invention can be effectively applied in a variety of different caching applications. Also, although in the embodiment described below the cache unit utilizes storage space provided by a hard disk to store the downloaded objects, it will be appreciated that the invention can be used to manage data storage spaces on other types of data storage media.

Figure 3:
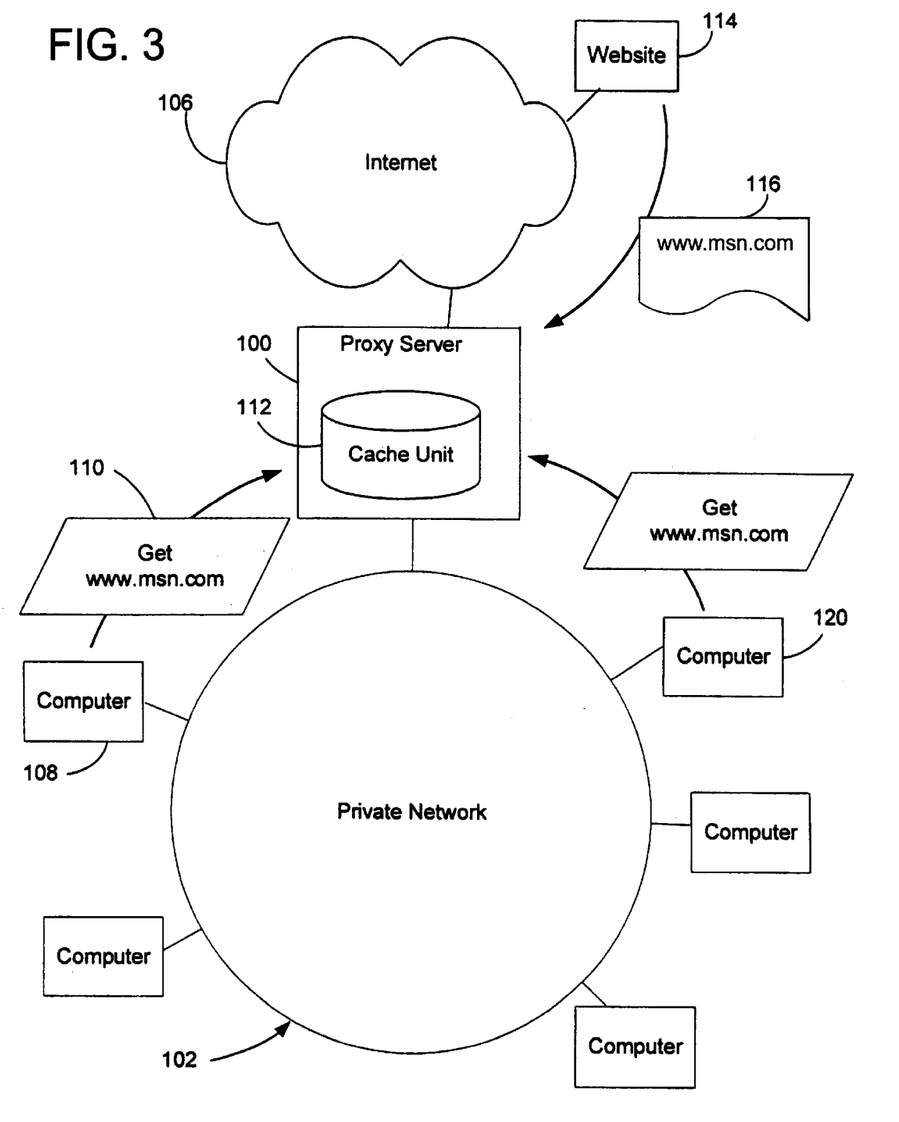
FIG. 3 is a schematic diagram showing an embodiment in which the data storage space is a cache used by a proxy server for caching data objects downloaded from Websites on the Internet.

Turning now to FIG. 3, in this embodiment, the proxy server 100 resides on a private network 102, such as a corporate network or a home network. The proxy server 100 is connected to the Internet 106 and functions as the gateway/firewall for the private network. The proxy server maintains a cache unit 112 for caching data objects downloaded from the Internet. Because the cache unit is expected to hold a large number of cached objects and therefore has a relatively large size, such as tens of gigabytes, the cache space is preferably provided by a hard drive or the like that has a large storage capacity.

When a computer 108 on the private network makes a request 110 for downloading a data object from the Internet, that request is sent to the proxy server 100. The requested data object is identified by a URL. For example, the requested data object may be the Web page corresponding to the URL www.msn.com. When the proxy server 100 receives the request 110, it checks the cache unit 112 to see whether there is an object in the cache that corresponds to the URL. If so, the proxy server retrieves the data object and sends it to the requesting computer 108. If the requested object is not in the cache 112, the proxy server 100 forwards the download request 110 to the Internet 106. The request is then routed to a pertinent Website 114, which in response transmits the requested data object 116 to the proxy server 100. The proxy server 100 stores the downloaded data object in the cache unit 112 and also sends it to the requesting computer 108.

Later, if the proxy server 100 receives another request for the same data object from the same computer 108 or a different computer 120, it can provide that object from the cache without having to download the object from the Internet again. Downloading a data object from the Internet often takes a long time, especially when the connection is slow. In contrast, the proxy server can provide the requested data object quickly if there is a cache hit.

Figure 4:
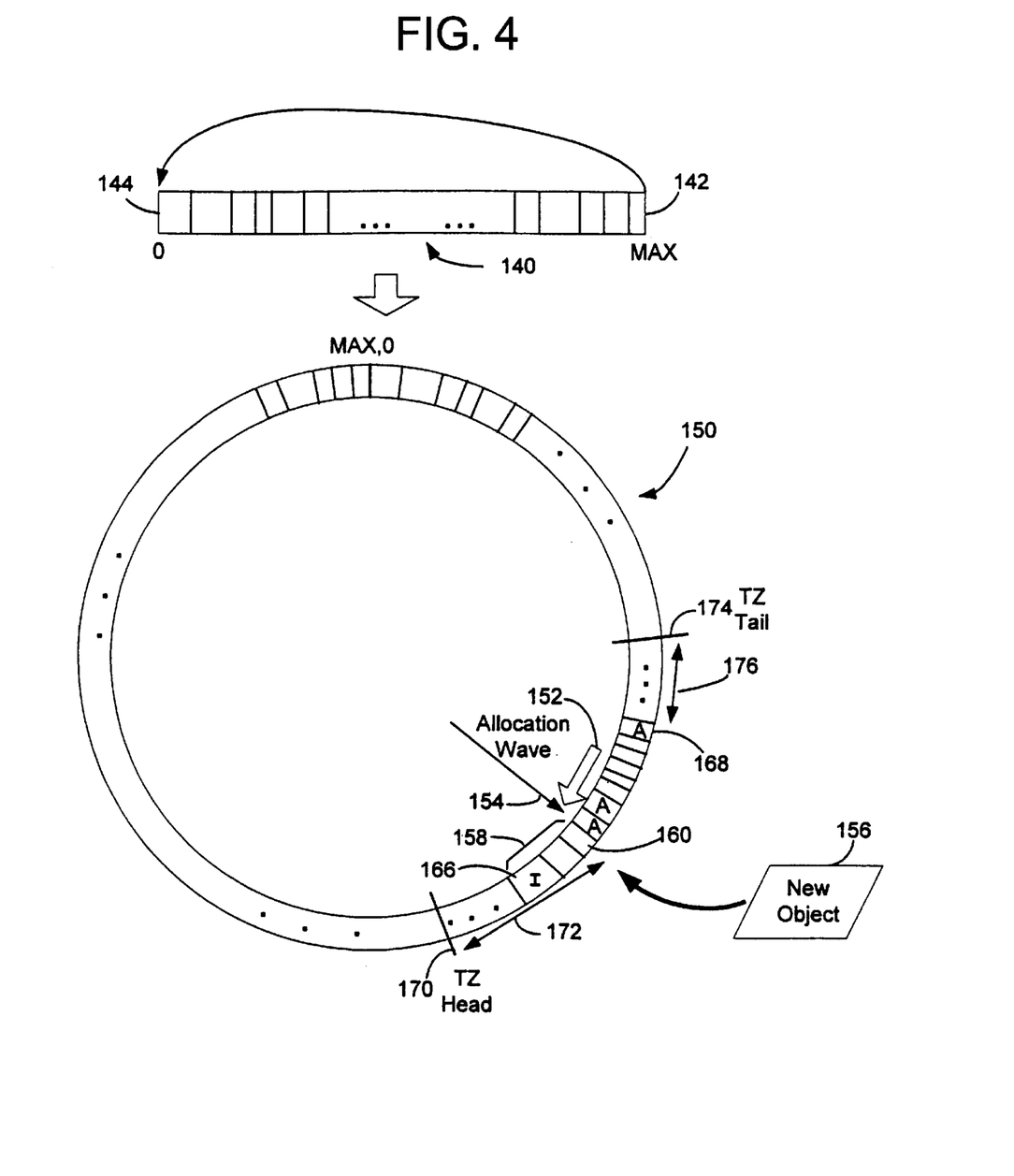
FIG. 4 is a schematic diagram showing the cache of the embodiment of FIG. 3 managed as a cyclic queue with a generally first-in-first-out space reclaiming scheme and having a transient zone for transaction management.

Turning now to FIG. 4, in accordance with a feature of a preferred embodiment, the cache space 112 is managed as a linear space 140 with its two ends connected (in the addressing sense) to form a cyclic queue. For illustration purposes the cyclic queue 150 as shown in FIG. 4 is given a reference numeral different from that of the linear space 140. It should be clear, however, that both the linear space 140 and the cyclic queue 150 are only different ways to conceptually view the same cache space 112 and are not meant to represent different physical entities.

The cyclic queue 150 is managed in a way that can be characterized as having a space-reclaiming scheme that operates in a generally first-in-first-out ("FIFO") manner but with "interruptions." Specifically, in accordance with an aspect of the embodiment, the data storage is performed on a block-by-block rather than object-by-object basis. Each cached object may occupy a single block (which is the most common case) or multiple blocks, if the object is large. As part of the write operations, storage space used by blocks of existing cached objects is reclaimed and allocated for writing new objects. The reclaiming and allocation of the cache space can be viewed as an "allocation wave" 152 that sweeps in a pre-selected direction over the "circular" cache space. An allocation wave ("AW") pointer 154, represented in FIG. 4 as an arrow, points to the front of this allocation wave, i.e., the point up to which the cache space has been reclaimed from old objects and allocated for writing new objects.

When there is a new object 156 to be written into the cache, the allocation logic checks one or more blocks 158 adjacent and downstream of the AW pointer 154 to see whether it can reclaim their space for writing the new object. This can be visualized as moving the AW front over blocks occupied by existing objects until it finds enough reclaimable space for the new object. As the allocation wave front moves over an existing block (e.g., the block 160), the cache space of that block is reclaimed unless that block is considered to be an "interruption," which means that for some reason that block should not be overwritten. When the allocation wave reaches such an "interruption" block (e.g., the block 162), it passes over that block and moves on to the next block, instead of reclaiming and allocating the space occupied by that "interruption" block for writing a new object. The allocation wave moves on until enough space is reclaimed for the new object.

Depending on the purposes for which the cache is used, there can be many different reasons for designating a cached block as an "interruption," i.e., a block that is to be left alone by the allocation wave. For instance, the block or blocks of a cached object may be designated as an "interruption" if that object is frequently or recently referenced. Such an object (e.g., the block 166) is often called a "hot" object. An "interruption" block may also be a block on which a read or write operation is ongoing and therefore should not be disturbed.

As the allocation wave 152 moves along the circular space 150, new objects are written over existing objects in a generally continuous manner, but with the "interruption" blocks passed over by the wave. Since the allocation wave travels in a pre-selected direction along the circular space, the order of the cached objects in the cache space generally correspond to the order in which the cache space is allocated for them. As the allocation wave goes around the circular cache space, the oldest cached objects (if they are not "interruptions") are written over the new objects, hence the "FIFO" designation.

For purposes of transaction management, a block on which a write operation is pending for completion is referred to as an "active" block. As described in connection with FIG.

2 above, the transaction management in accordance with the invention uses a transient zone to cover the "active area" of the data storage space in which write operations are being performed. In the embodiment of FIG. 4, the active area may be defined as the region between (and including) the oldest block 168 on which a write operation is not yet completed and the front edge of the block that has been allocated most recently for writing a new object as indicated by the AW pointer 154. Since the allocation wave moves in a constant direction, all of the active blocks created by the allocation wave fall within this active area. When new block write operations are initiated, the front of the active area progresses or expands. When the oldest ongoing write operation completes, the rear edge of the active area moves to the base address of the next oldest ongoing write operation. More precisely, it moves to the active block that has the smallest base address.

In a preferred embodiment, the I/O write operations on a cache are executed asynchronously and concurrently. Consequently, a sequence of I/O write operations may not be completed in the order in which they are initiated. Nevertheless, with the cache space managed in the generally FIFO manner as described above, it is very likely that a sequence of I/O write operations will be completed close to the order in which they are initiated. This property helps to keep the size of the active area manageable, as the active area is not likely to be overstretched due to incompletion of the write operation on the block at the rear edge of the active area. In the rare occasion when the active area overstretches and the progress of the transient zone head is constrained, the allocation wave may hit the transient zone head. In that case, space allocation is stopped, which consequently stops the stream of write requests, which in turn frees I/O resources to complete the outstanding I/O operations that caused the active area overstretching.

In the embodiment sown in FIG. 4, the transient zone ("TZ") head 170 is set such that it leads the allocation wave pointer 154 by a margin 172. The transient zone tail 174, on the other hand, trails behind or up to the oldest active block 168. Since in this embodiment the cache space is managed as blocks, the transient zone head and tail, like the allocation wave, move by steps in terms of blocks. That is, each of them points to the base address of a block.

In accordance with an aspect of the embodiment, the transient zone head 170 and tail 174 are not moved every time the active area is moved, which occurs either when existing blocks are reclaimed or when the write operation on the oldest active block 168 (i.e., the rear edge of the active area) is completed. Instead, the margin 172 by which the transient zone head 170 leads the allocation wave is allowed to be reduced as the active area moves, and the transient zone head is moved only when it is necessary to do so in order to maintain a comfortable margin. Likewise, the transient zone tail 174 is moved only when the gap 174 between it and the oldest active object 168 at the rear edge of the active area has exceeded a pre-selected distance. In other words, the movement of the transient zone boundary is performed based on a "lazy" model. In a preferred implementation, the TZ tail update is usually piggybacked on the TZ head updates. By doing so, the TZ tail updates virtually consume no I/O write operations.

Since the active area may be moved many times before the transient zone head or tail has to be moved, the lazy model significantly reduces the overhead of keeping track of the transient zone boundary. The combination of this lazy model with the use of transient zone for transaction management, which is already extremely simple in operation, allows transaction management to be provided using an extremely low overhead, low complexity, and simple mechanism.

By way of example, in one implementation, the transient zone head is moved only when the margin becomes smaller than a lower limit called Min_TZ_Margin, which is defined as:

Min_TZ_Margin=min (5% cache size, Min_TZ_Upperbound), where Min_TZ_Upperbound is a preselected upper limit, such as 1 Mbytes, for Min_TZ_Margin. Both the 5% and Min_TZ_Upperbound can be adjusted, of course, to increase or decrease the lower limit of the margin.

Each time the allocation logic allocates the space for caching a new object, the transaction manager checks the margin between the TZ head and the allocation wave pointer. If the margin falls below the Min_TZ_Margin, the TZ head is moved to a new location, which is selected such that the new margin is smaller than an upper limit called Max_TZ_Margin, which is defined as:

Max_TZ_Margin=min (10% cache size, Max_TZ_Upperbound), where Max_TZ_Upperbound is an upper bound of the margin (e.g., 2 Mbytes)

In one implementation, the process of space allocation and writing the cached data continues concurrently with the process of updating the TZ boundary information record. It is possible, although very rare, that the process of updating and persisting a record of boundary information may last so long that the allocation wave catches up with and collides with the TZ head. In that rare situation, the allocation wave stalls until the boundary record update process is completed. Consequently, allocation requests and caching are temporarily denied. For purposes of determining whether the above collision situation has occurred, the allocation wave is compared with the TZ head field in the most recent stable boundary information record.

As mentioned earlier, a database management system should satisfy the ACID requirements, wherein "ACID" stands for atomicity, consistency, isolation, and durability. In the embodiment described above, atomicity of the cache is facilitated by the lazy transaction mechanism in accordance with the invention. As to the other requirements, consistency is provided by the cache by including a time stamp per block to avoid version mismatch. Isolation is supported by means of object locking as long as they are not stable. The locking applies to both single block and multi-block objects, where cache-hits are blocked till the whole object is cached. Durability is easily provided because the cache and the lazy transaction mechanism are implemented for persistent media, such as a hard disk.

The concept of providing transaction management by persistently tracking a transient zone covering an active area has been illustrated above only in the case where the data storage space is a linearly addressable space. It will be appreciated, however, that this concept can be easily expanded for applications where the data storage space is addressed as a two or higher dimensional address space. For instance, for a data storage space with a two-dimensional addressing space, the write operations can be managed such that the active objects form a well defined generally localized two-dimensional active area. A transient zone may then be defined, for example, as a circle or a rectangle that includes the active area, and the boundary of the transient zone is persistently tracked. In the case of a non-graceful shutdown, the data in the transient zone can be discarded, while the data outside the transient zone remain usable. In this way, even in an addressing space with two or higher dimensions, transaction management can be effectively provided with great simplicity and low overhead.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for performing transaction management for a data storage space, comprising:
    identifying a generally localized active area in the data storage space, the active area containing active data objects on which write operations are ongoing;
    setting a transient zone within the data storage space with a boundary that contains the active area;
    adjusting the boundary of the transient zone as the active area changes for maintaining a margin between the boundary of the transient zone and the active area;
    storing data representing the boundary of the transient zone to a persistent medium; and
    in a case of non-graceful shutdown, discarding without recovery data objects within the transient zone as defined by the data representing the boundary of the transient zone stored on the persistent medium.

2. A computer-readable medium as in claim 1, wherein the data storage area is a persistent, linearly addressable, and sequentially accessible medium.

3. A computer-readable medium as in claim 2, having further computer-executable instructions for performing the steps of:
    setting an allocation pointer for identifying a point in the data storage space up to which storage space has been reclaimed for writing new data objects;
    moving the allocation pointer in a pre-selected direction over adjacent existing data objects in the data storage space and reclaiming space occupied by the existing data objects if they are allowed to be overwritten for writing new data objects.

4. A computer-readable medium as in claim 3, wherein the transient zone has a head and a tail.

5. A computer-readable medium as in claim 4, wherein the step of storing data representing the boundary of the transient zone includes maintaining two records used alternatingly to record the transient zone head and tail when the transient zone is adjusted, whereby it is ensured that at a given time at least one of the records is guaranteed to be stable and valid.

6. A computer-readable medium as in claim 5, wherein each of the records contains data representing the transient zone head and tail, a time stamp, and a hash value of data including the data representing the transient zone head and tail and the time stamp.

7. A computer-readable medium as in claim 4, wherein the step of adjusting includes resetting the transient zone head to maintain a lead over the allocation pointer above a pre-defined lower limit.

8. A computer-readable medium as in claim 1, wherein the data storage space is a cache.

9. A computer-readable medium as in claim 8, wherein the active data objects are objects downloaded from the Internet.

10. A method of performing transaction management for a data storage space, comprising:
    identifying a generally localized active area in the data storage space, the active area containing active data objects on which write operations are ongoing;
    setting a transient zone within the data storage space with a boundary that contains the active area;
    adjusting the boundary of the transient zone as the active area changes for maintaining a margin between the boundary of the transient zone and the active area;
    storing data representing the boundary of the transient zone to a persistent medium; and
    in a case of non-graceful shutdown, discarding without recovery data objects within the transient zone as defined by the data representing the boundary of the transient zone stored on the persistent medium.

11. A method as in claim 10, wherein the data storage area is a persistent, linearly addressable, and sequentially accessible medium.

12. A method as in claim 11, further comprising the steps of:
    setting an allocation pointer for identifying a point in the data storage space up to which storage space has been reclaimed for writing new data objects;
    moving the allocation pointer in a pre-selected direction over adjacent existing data objects in the data storage space and reclaiming space occupied by the existing data objects if they are allowed to be overwritten for writing new data objects.

13. A method as in claim 12, wherein the transient zone has a head and a tail.

14. A method as in claim 13, wherein the step of storing data representing the boundary of the transient zone includes maintaining two records used alternatingly to record the transient zone head and tail when the transient zone is adjusted, whereby it is ensured that at a given time at least one of the records is guaranteed to be stable and valid.

15. A method as in claim 14, wherein each of the records contains data representing the transient zone head and tail, a time stamp, and a hash value of data including the data representing the transient zone head and tail and the time stamp.

16. A method as in claim 13, wherein the step of adjusting includes resetting the transient zone head to maintain a lead over the allocation pointer above a pre-defined lower limit.

17. A method as in claim 10, wherein the data storage space is a cache.

18. A computer comprising:
    a proxy server for downloading data objects from the Internet in response to requests from a private network on which the computer resides;
    a data storage space containing a cache for storing data objects downloaded by the proxy server from the Internet;
    the proxy server being programmed to perform steps for performing transaction management of the data storage space, comprising:
        identifying a generally localized active area in the data storage space, the active area containing active data objects on which write operations are ongoing;
        setting a transient zone within the data storage space with a boundary that contains the active area;

adjusting the boundary of the transient zone as the active area changes for maintaining a margin between the boundary of the transient zone and the active area;

storing data representing the boundary of the transient zone to a persistent medium; and in a case of non-graceful shutdown, discarding without recovery data objects within the transient zone as defined by the data representing the boundary of the transient zone stored on the persistent medium.

19. A computer as in claim 18, wherein the proxy server is further programmed to perform the steps of:

setting an allocation pointer for identifying a point in the data storage space up to which storage space has been reclaimed for writing new data objects; and moving the allocation pointer in a pre-selected direction over adjacent existing data objects in the data storage space and reclaiming space occupied by the existing data objects if they are allowed to be overwritten for writing new data objects.

20. A computer as in claim 18, wherein the proxy server is programmed to perform the step of storing data representing the boundary of the transient zone by maintaining two records used alternatingly to record the boundary of the transient zone when the transient zone is adjusted, whereby it is ensured that at a given time at least one of the records is guaranteed to be stable and valid.

* * * * *